US005383200A

United States Patent [19]
Barrett et al.

[11] Patent Number: 5,383,200
[45] Date of Patent: Jan. 17, 1995

[54] EYE SAFE LASER IMAGING SYSTEM

[75] Inventors: Joseph J. Barrett, Morris Plains; Joseph Yee, Fort Lee; William R. Rapoport, Bridgewater, all of N.J.

[73] Assignee: AlliedSignal Inc., Morris Township, Morris County, N.J.

[21] Appl. No.: 169,289

[22] Filed: Dec. 20, 1993

[51] Int. Cl.⁶ .............................................. H01S 3/13
[52] U.S. Cl. ..................................... 372/25; 372/29; 372/30; 250/214 VT; 250/227.2; 356/318; 342/54
[58] Field of Search ............................. 372/30, 29, 25; 250/214 VT, 227.2; 356/318; 342/54

[56] References Cited

U.S. PATENT DOCUMENTS

| 4,611,920 | 9/1986 | Tsuchiya | 356/18 |
| 4,642,452 | 2/1987 | Loy | 250/214 VT |
| 4,755,664 | 7/1988 | Holmes et al. | 250/214 VT |
| 4,920,386 | 4/1990 | Tsuchiya et al. | 250/214 VT |
| 5,237,331 | 8/1993 | Henderson et al. | 342/54 |

Primary Examiner—Georgia Y. Epps
Attorney, Agent, or Firm—Verne E. Kreger, Jr.

[57] ABSTRACT

An active night vision system capable of viewing a target over long distances utilizes laser illumination in eye-safe, invisible wavelength regions of about 1.52–1.76 μm or about 2.03 μm–2.34 μm for illuminating a target; and electronically receives, intensifies and displays or stores the reflected image.

11 Claims, 7 Drawing Sheets

EYE SAFE LASER IMAGING SYSTEM

FIELD OF THE INVENTION

This invention relates to laser-illuminated active night viewing systems.

BACKGROUND OF THE INVENTION

Passive night vision devices, based on micro-channel image intensifiers, are capable of up to a million-fold multiplication of available light. The phosphor screen output of such devices can be directly coupled or imaged onto a video camera for viewing on a TV monitor.

However, passive night vision devices have severe limitations. Frequently, the amount of ambient light is insufficient for proper target illumination, and targets cannot be identified, especially at long ranges. In that event, active illumination is required. U.S. Pat. No. 4,642,452 to Loy discloses an integrated active night vision system consisting of a low power near infrared illumination source, an intensified receiver and a monitor. Illumination is provided by low power light flashes of very short duration. The light source is either a diode laser which emits pulses on the order of a microsecond in the near infrared, or a flashlamp with output pulses of 10 to 20 milliseconds duration which are passed through an infrared filter. The image intensifier is gated to reduce atmospheric backscatter.

In situations where covertness is required, the active illumination source is restricted to the near infrared (IR) spectral region or below 0.4 $\mu$m. A main disadvantages of operation within this spectral region is that the transmitted output radiation may not be eye safe between the transmitter and the target, precluding use of such systems for imaging applications where eye safety is of concern.

Lasers are a desirable light source for active imaging systems because the high brightness and coherence of laser beams permit illumination of targets over long distances up to about 10 km and more.

This invention provides an active imaging system based on a laser illuminating source operating in the infrared region which is invisible to the human eye, which is capable of penetrating the atmosphere over long distances, and which is safe to the human eye.

SUMMARY OF THE INVENTION

This invention provides an active night vision system capable of viewing a target over long distances comprising, in combination, (a) laser means for emitting a beam of coherent radiation having wavelength of from about 1.52 $\mu$m to about 1.76 $\mu$m or from about 2.03 $\mu$m to about 2.34 $\mu$m for illuminating a target;

(b) receiving means for receiving an image of the reflected radiation from said target and for transforming the optical image into an electronic signal; and (c) means for electronically storing and/or displaying the image received by said receiving means.

Within the range of from about 1.52 $\mu$m to about 1.76 $\mu$m, the beam of coherent radiation desirably has an intensity of less than about 1.0 Joule/cm$^2$, measured at the source. Within the range of from about 2.03 $\mu$m to about 2.34 $\mu$m, the beam of coherent radiation desirably has an intensity of less than about 0.1 Joule/cm$^2$, measured at the source. A single pulse of the coherent radiation beam (laser beam) will produce a complete image of the target. The beam of coherent radiation desirably is operated as a single pulse or at a rate of from about 1 to about 30 pulses per second. Desirably, the beam is one that has at least 80% transmission through atmospheric air over a distance of 2 kilometers at an elevation of 5 meters, as determined from the FASCODE (Fast Atmospheric Signature Code) computer model. This model permits calculation of the spectral transmittance and radiance of the atmosphere. It was developed by the Air Force Geophysics Laboratory, Air Force Systems Command, USAF, Hanscom AFB, Massachusetts. The model carries out a line-by line calculation of the spectral transmittance and radiance for a variety of atmospheric conditions. Horizontal as well as slant path geometries can be specified, with different path length. It covers the spectral region from microwave to near ultraviolet. The model includes six representative atmospheres, along with the option of a user-defined atmosphere. Aerosols, fog, rain and clouds can be specified. The model's spectral data are contained in the HITRAN high-resolution transmission molecular absorption database.

The means for generating the laser beams meeting these criteria are conventional and not part of this invention. The laser means further comprises transmitter optics for controlling the laser beam angle, to thereby control the size of the illuminated spot at the target.

The receiving means comprises collection optics for receiving the light reflected from the target, and guiding it to means for transforming the optical signal into an electronic signal for further processing, such as an intensified video camera. Desirably, the video camera is gated, synchronous with the laser pulses, to receive substantially only the reflected light, while avoiding overload from the outgoing laser beam's backscatter.

Through suitable means, the electronic signal can be optically displayed, e.g. on a video monitor; be printed on a suitable substrate; or be electronically stored for further processing or later access. The electronic signal may also be used as input to a computer algorithm for target acquisition and identification.

The present invention further provides a method of viewing a target involving (a) illuminating the target with coherent radiation having wavelength of from about 1.52 $\mu$m to about 1.76 $\mu$m or of from about 2.03 $\mu$m to about 2.34 $\mu$m; (b) sensing the radiation reflected from the illuminated target within said wavelengths; (c) intensifying said sensed reflected radiation; and (d) displaying said intensified, sensed reflected radiation. The intensified, sensed reflected radiation may also be stored for later viewing or processing.

BRIEF DESCRIPTION OF THE DRAWINGS

In the annexed drawings.

Figure 1:
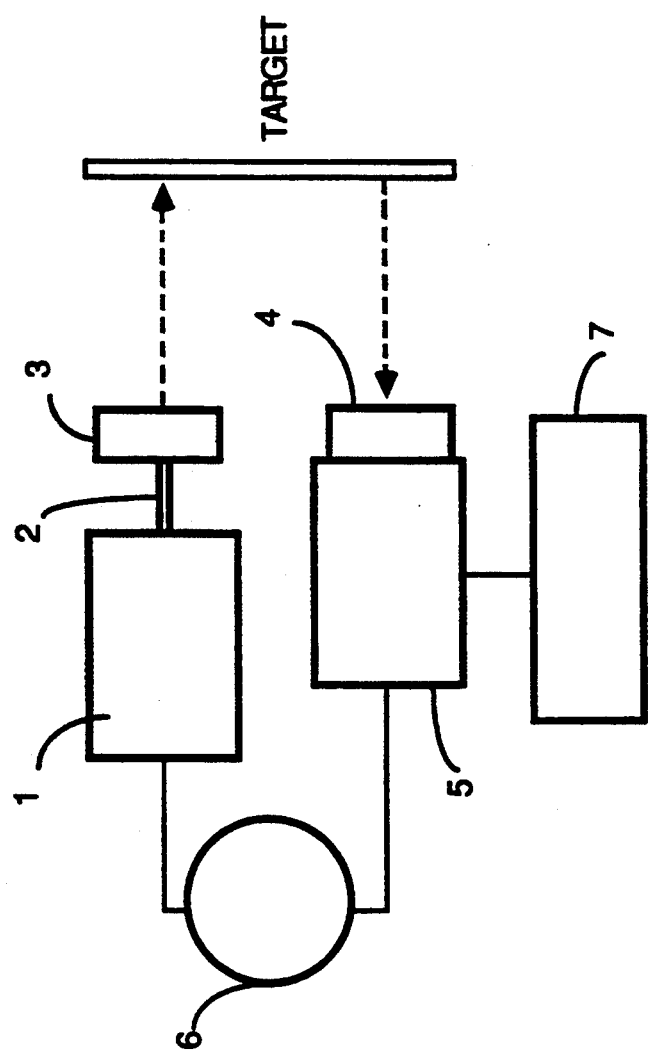
FIG. 1 schematically illustrates an imaging system of this invention.
Figure 2:
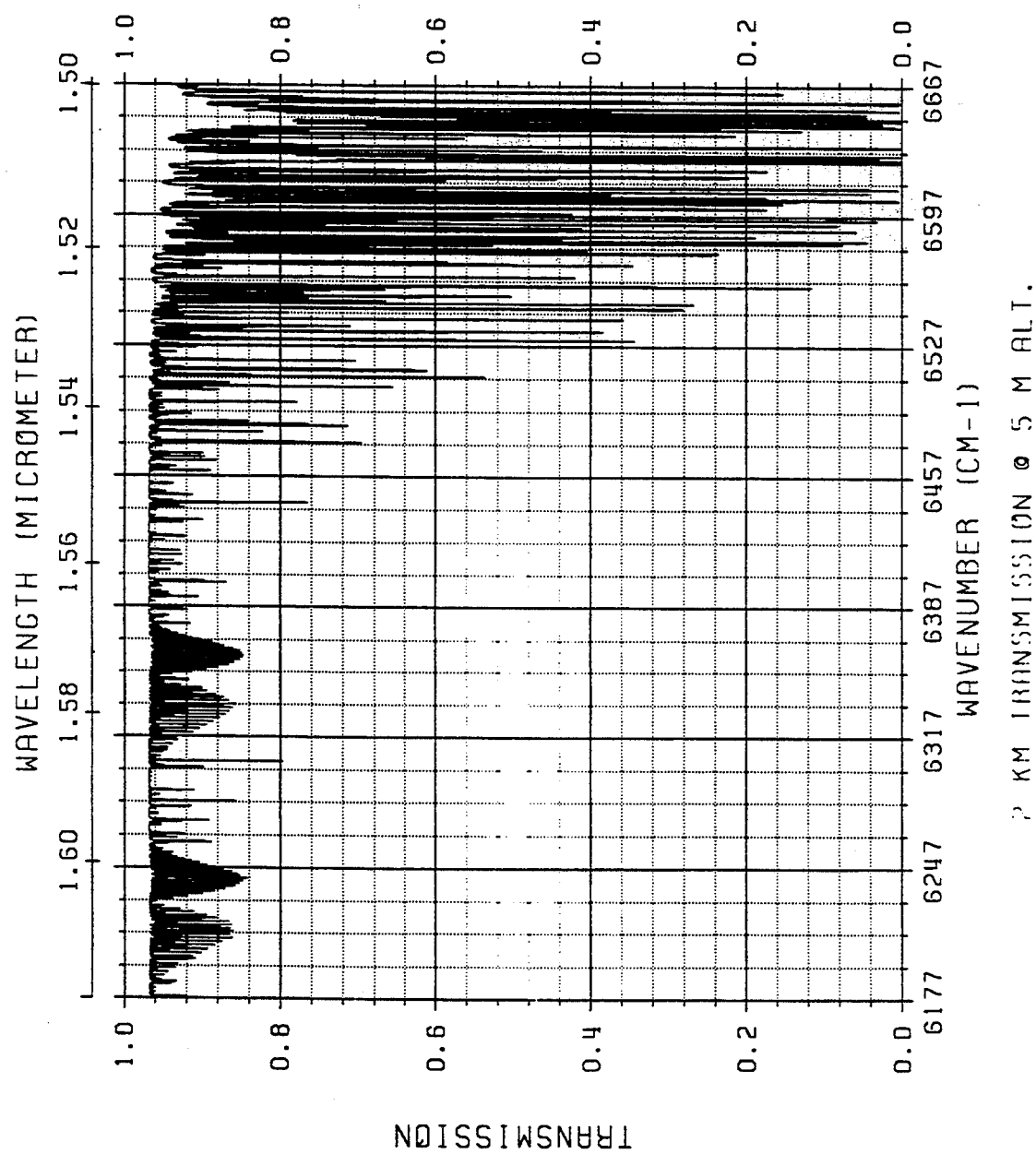
FIGS. 2 through 6 present curves showing the spectral transmission of atmospheric air over a horizontal distance of 2 km at 5 m elevation in the wavenumber regions from 6,177–6,667 (FIG. 2); 5,687–6,177 (FIG. 3); 5,197–5687 (FIG. 4); 4,707–5,197 (FIG. 5); and 4,217–4,707 (FIG. 6). The data in these FIGS. are based on the mid-latitude summer atmospheric model included in FASCODE.
Figure 3:
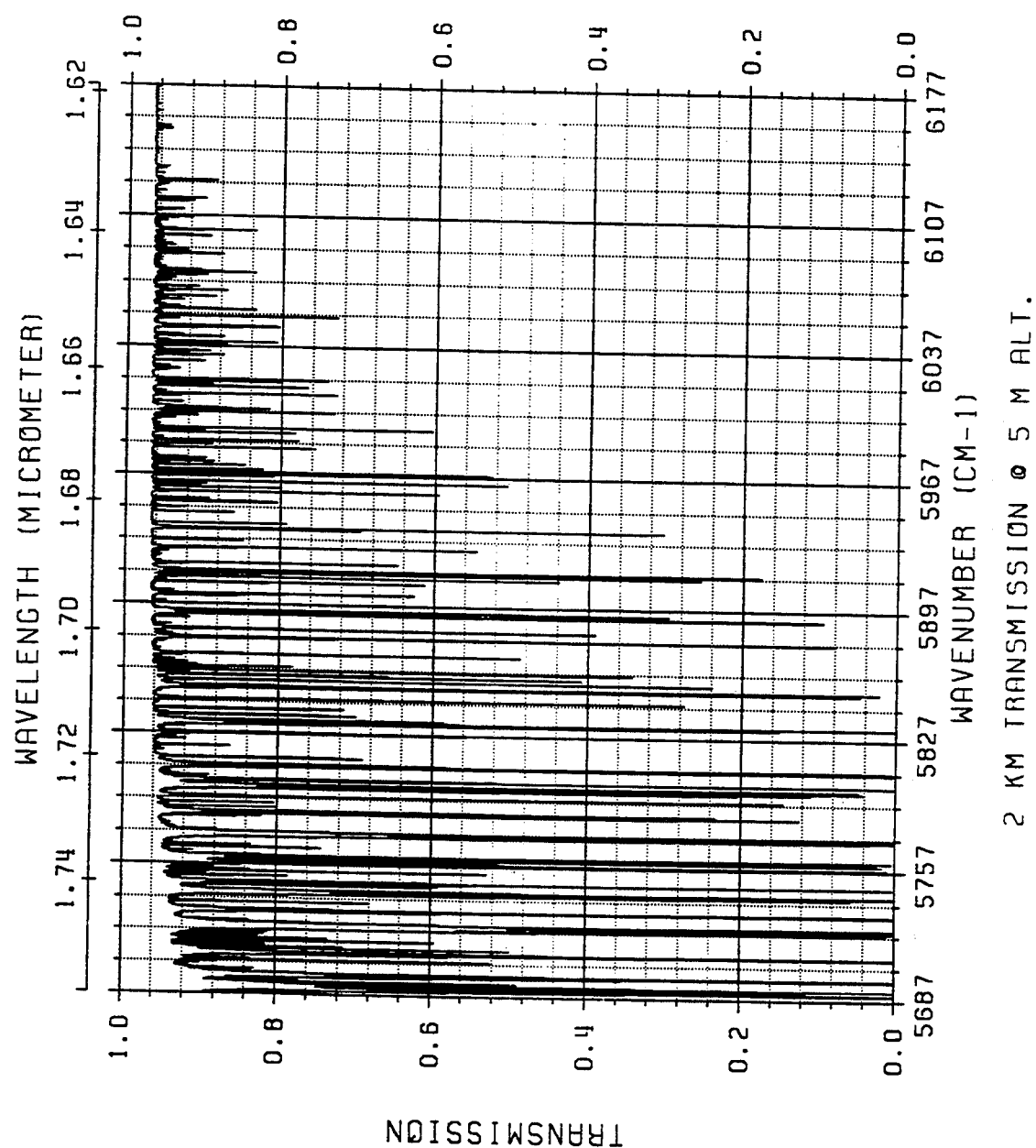
Figure 4:
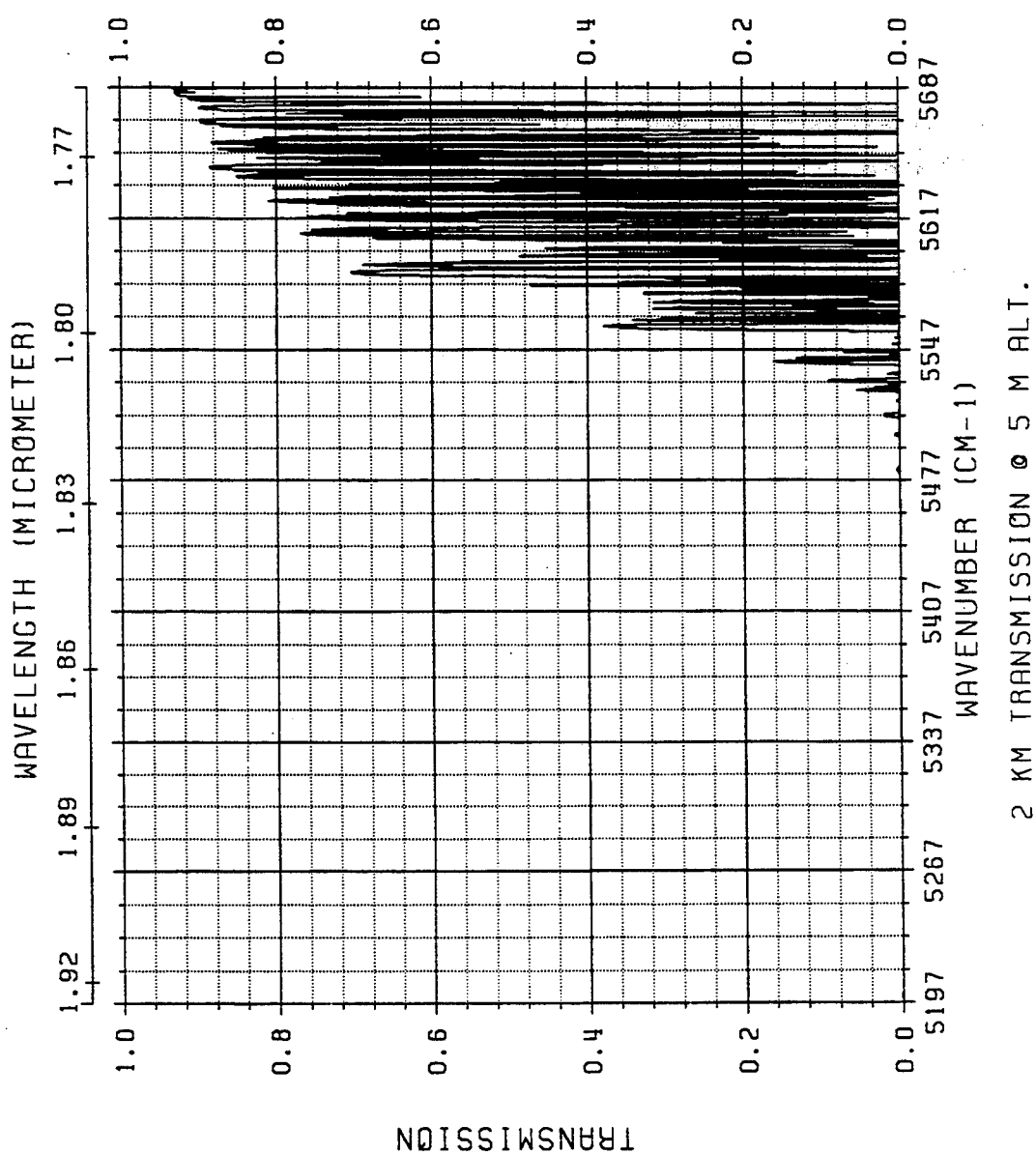
Figure 5:
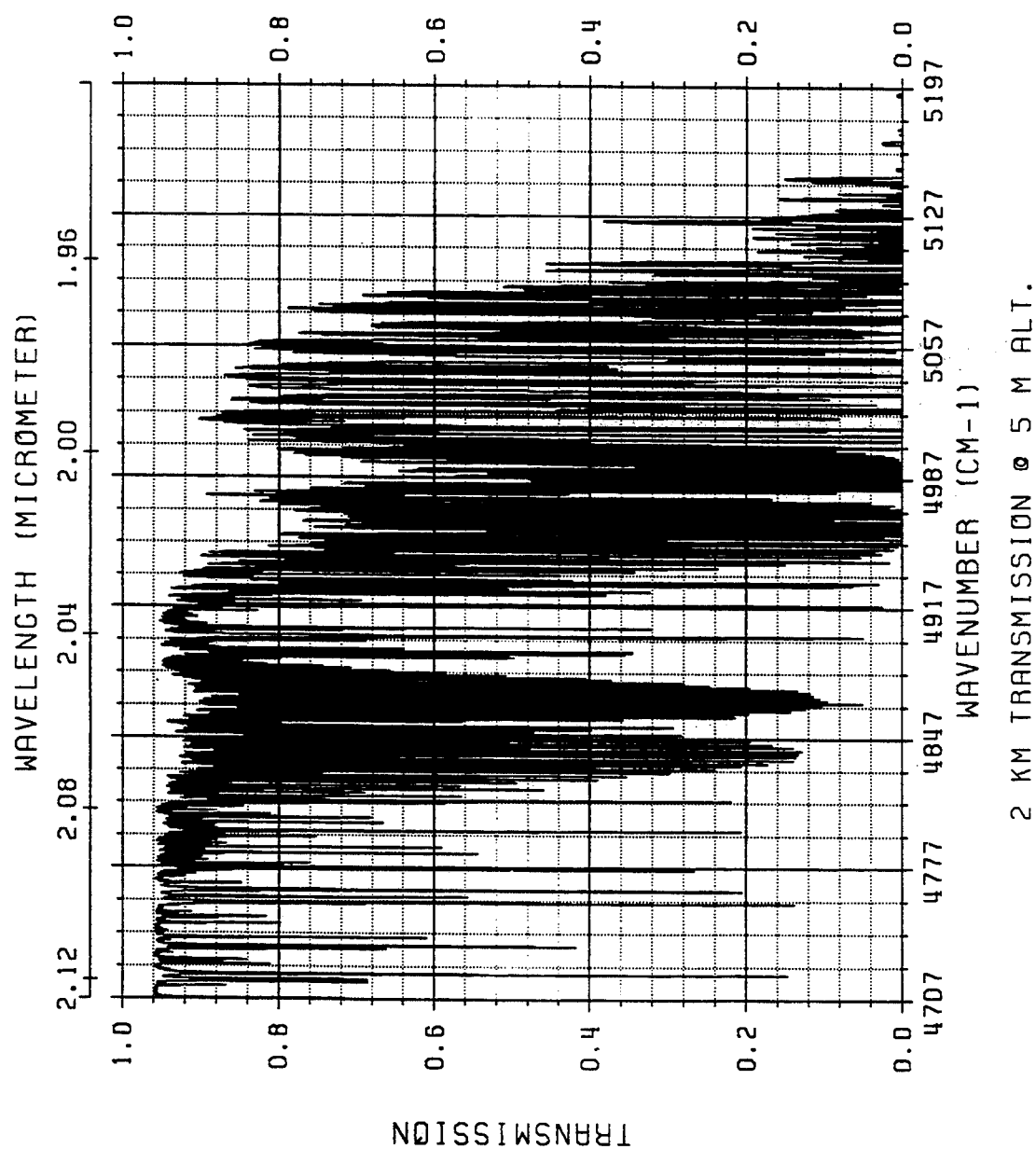
Figure 6:
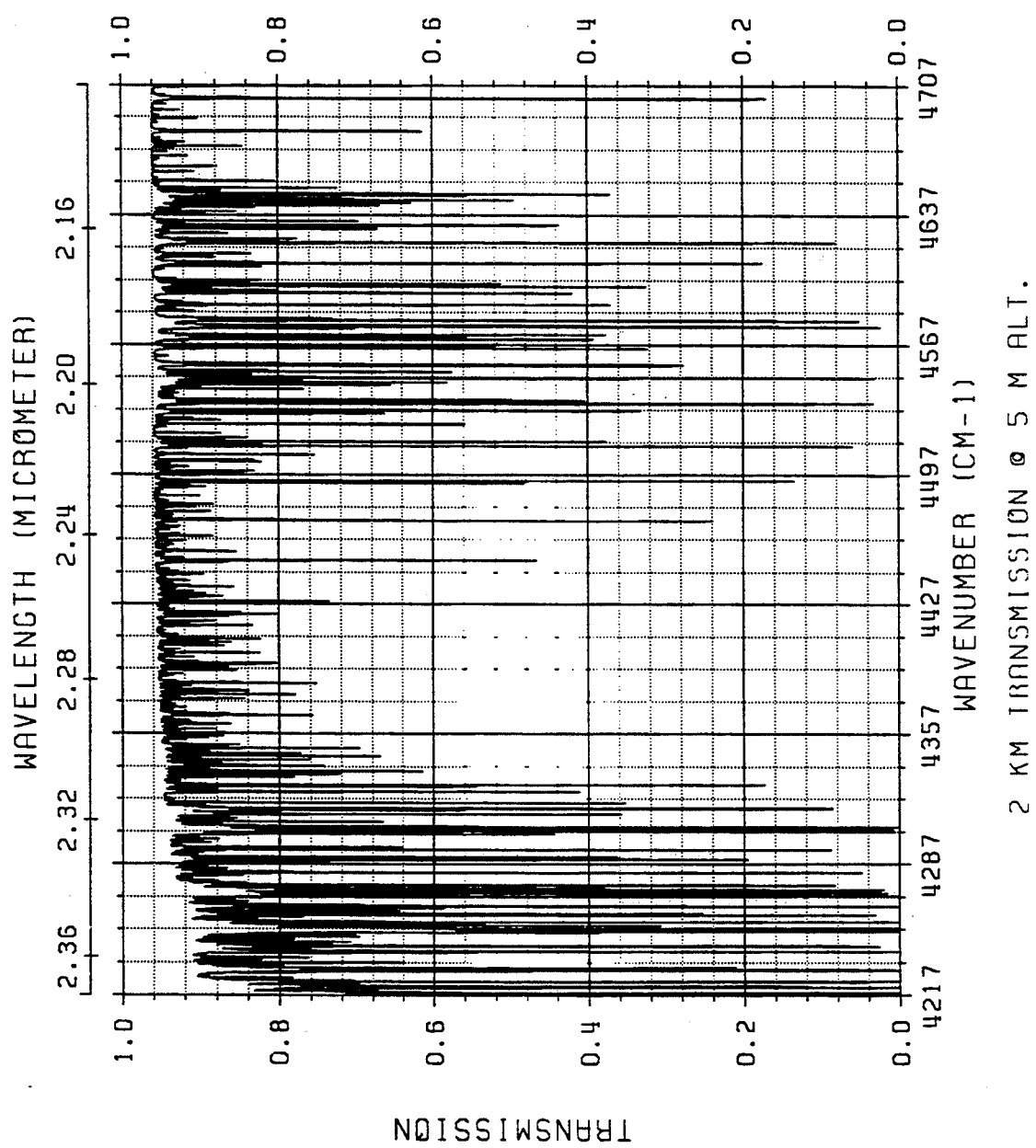
Figure 7:
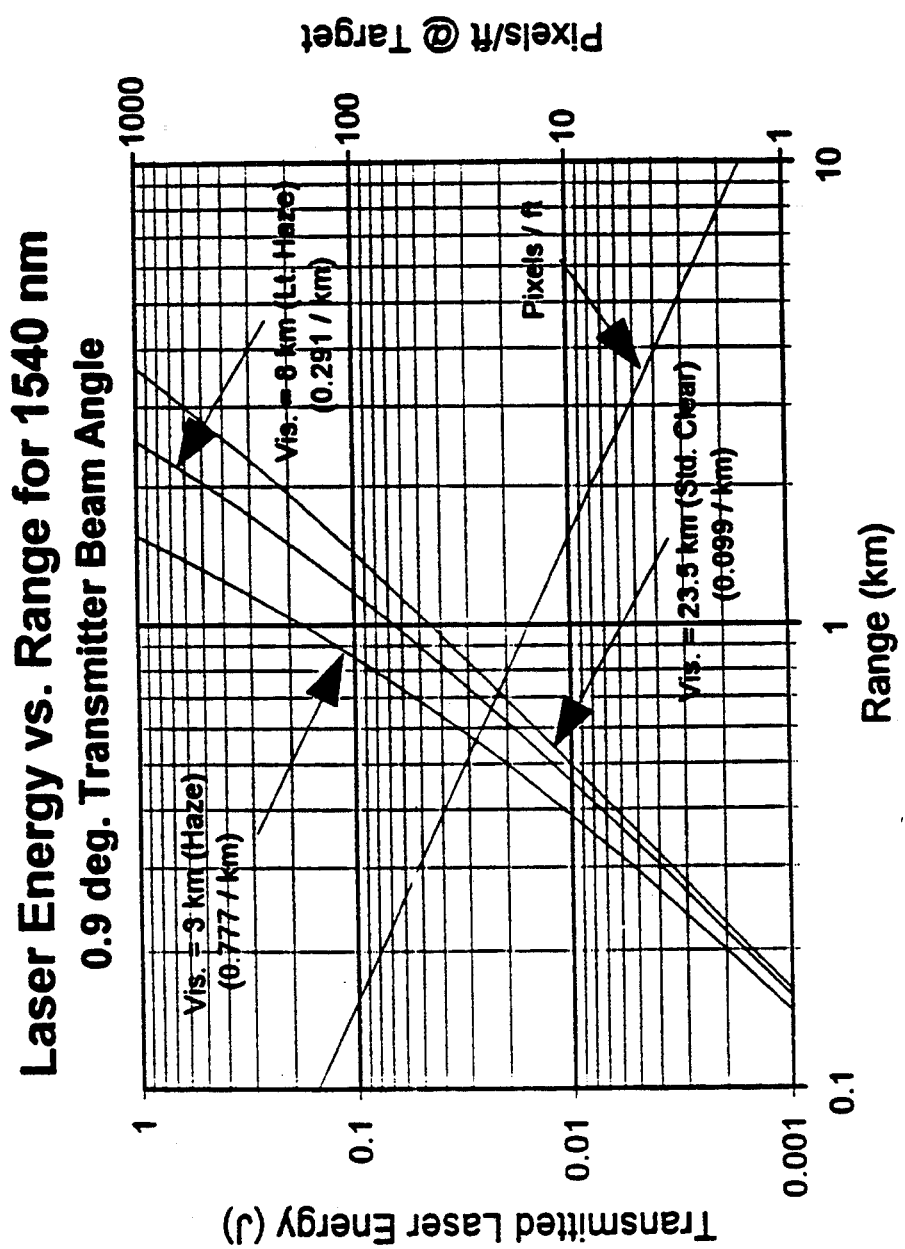
FIG. 7 represents a calculated performance plot of laser energy vs. range for an eye safe imaging system of this invention.

DETAILED DESCRIPTION OF THE INVENTION, OF THE PREFERRED EMBODIMENTS, AND OF THE BEST MODE PRESENTLY CONTEMPLATED FOR ITS PRACTICE

Eye Safety

The maximum permissible exposure (MPE) for direct ocular exposure (intrabeam viewing) of a laser beam may be determined for different laser sources that are potential candidates for use in eye safe imaging systems. The American National Standard for the Safe Use of Lasers, ANSI Z136.1-1993 provides the information for calculating the MPE values for laser sources in different spectral regions, and with different pulse lengths. For pulsed laser sources operating in the spectral region from 1.500 to 1.800 $\mu$m with pulse lengths between $10^{-9}$ to 10 seconds, the MPE value is 1.0 J/cm$^2$. For pulsed laser sources operating in the spectral region from 1.800 $\mu$m to 2.600 $\mu$m with pulse length of $10^{-9}$ to $10^{-3}$ seconds, the MPE value is 0.1 J/cm$^2$. For the reason of greater permitted eye safe intensity, operation within the 1.52 to 1.76 $\mu$m wavelength region is preferred. The results of the MPE calculations for several different laser sources are shown in Table 1, below.

TABLE 1

| Maximum Permissible Exposure (MPE) Values | | |
|---|---|---|
| Laser Source | Wavelength ($\mu$m) | MPE (Joules/cm$^2$) |
| Frequency-doubled alexandrite | 0.378 | $8.4 \times 10^{-3}$ |
| Frequency-doubled Nd:YAG | 0.532 | $5.0 \times 10^{-7}$ |
| Ruby | 0.694 | $5.0 \times 10^{-7}$ |
| Alexandrite | 0.755 | $6.4 \times 10^{-7}$ |
| Nd:YAG | 1.064 | $5.0 \times 10^{-6}$ |
| Optical Parametric Oscillator | 1.52-1.76 | 1.0 |
| Optical Parametric Oscillator | 2.03-2.34 | 0.1 |

From the data shown in Table 1, the optical parametric oscillator operating in the spectral region 1.52 to 1.76 $\mu$m is the most eye safe laser of all those listed in the table. The MPE value of 1 J/cm$^2$ far exceeds the anticipated transmitted laser energy for the active imaging system.

Atmospheric Transmission

FIGS. 2 through 6 show the atmospheric transmission at wavelength from about 1.50 to about 2.36 $\mu$m. These figures were plotted using the FASCODE atmospheric computer model with the HITRAN data base, with a personal computer (PC) version of the FASCODE program, PCLnTRAN, which is available from Ontar Corp., North Andover, Mass. The spectral data for seven molecular species ($H_2O$, $CO_2$, $O_3$, $N_2O$, $CO$, $CH_4$ and $O_2$) were utilized in the calculation.

The transmission plots are for a 2 km horizontal path at a height of 5 meters above the ground. It should be noted that these data are based on optimal conditions. Actual transmission would be expected to be lower for reasons of adverse atmospheric conditions, such as haze, pollution, fog and the like.

As the above data on eye-safety and atmospheric transmission in the eye safe region indicate, there are windows in the regions from about 1.52 to about 1.76 $\mu$m, and from about 2.03 to about 2.34 $\mu$m having at least 80% transmission over 2 km at an elevation of 5 m permitting safe operation of an eye safe, covert, long distance laser imaging system.

Within these windows, the regions from about 1.532 to about 1.661 $\mu$m, from about 2.034 to about 2.048 $\mu$m, and from about 2.078 to about 2.315 $\mu$m are preferred, for reasons apparent from the FIGS. For these spectral regions the transmission over a 2 km horizontal path is greater than 80%, except for a few isolated spectral lines.

The following spectral ranges are most preferred, because in these ranges the transmission is greater than 90%, except for a few isolated spectral lines: from about 1.538 to about 1.570 $\mu$m; from about 1.582 to about 1.600 $\mu$m; from about 1.612 to about 1.651 $\mu$m; from about 2.034 to about 2.038 $\mu$m; from about 2.102 to about 2.148 $\mu$m; and from about 2.219 to about 2.298 $\mu$m.

The Laser Means

The development of high energy optical parametric oscillators (OPOs) has resulted in laser sources with sufficient output in the 1.5-1.8 $\mu$m and 2.0-2.4 eye safe spectral windows so as to be suitable as illumination sources. The active imaging system is covert because the emission in these regions is beyond the response of current night vision devices and conventional image converter tubes. Until recently, the only high energy per pulse lasers (>0.1 J) in the eye safe spectral band were erbium-doped glass lasers, which had severe repetition rate limits due to the host material, and Nd:YAG lasers whose outputs were Raman shifted in methane gas. While workable, neither is a practical sources for a real time imaging system.

Recent resurgence of parametric conversion technology through the discovery of new non-linear crystals and improved damage resistance of these crystals have created a new class of tunable lasers with high energy per pulse output which are suitable for use in the imaging system of the present invention. Such systems are known, but briefly described here. Pump light in an optical parametric oscillator (OPO) enters a small resonant cavity consisting of two mirrors surrounding a non-linear crystal. Signal and idler beams are created by meeting phase matching conditions inside a temperature-controlled, angularly-oriented, non-linear crystal. The wavelength of the idler beam is greater than the signal beam which is greater than the pump beam. Oscillation of the signal beam occurs when the crystal and mirrors are oriented for feedback of the signal beam, thereby depleting the pump beam. A special case occurs when the crystal is operated in the non-critically phase matched (NCPM) condition where the beams co-linearly propagate down a crystal axis. This condition maximizes the effective non-linear coefficient, reduces walk-off losses, and allows long crystals to be used to reduce threshold and increase conversion efficiency.

More specifically, generation of 1.571 $\mu$m laser pulses of 450 mJ/pulse at 10 Hz generated using an OPO pumped by a Nd:YAG laser were recently reported (Laser Focus World, Vol. 29, No. 9, p. 9, 1993). The pump laser was a conventional 1.1 Joule per pulse flashlamp pumped multi-mode Nd:YAG oscillator-amplifier with poor beam quality with a 10 ns pulsewidth. The OPO cavity consisted of 2 mirrors separated by 3 cm surrounding an x-cut ($\Theta=90°$, $\Phi=0°$) 8×8×20 mm potassium titanyl phosphate (KTP) crystal at room temperature operated in the NCPM Type II mode. This system produced 450 mJ/pulse at 10 Hz for a 41% conversion efficiency. The beam quality was similar to that of the pump laser which is acceptable for the imaging system. Laser systems based on Nd:YLF have operated with pulse repetition frequencies up to 50 Hz with approximately the same slope efficiency. The OPO output wavelength for use in the active imaging system is in the spectral range between 1.5 to 1.6 μm, preferably at about 1.550 μm. Temperature tuning of the KTP crystal can result in a small amount of wavelength tunability.

Another suitable transmitter source is an OPO pumped with an alexandrite laser. In this case, the non-linear crystal is lithium triborate (LBO) operated in the Type I phase matching condition. Operation is in the degenerate mode where the signal and idler beams converge to the same wavelength and both beams are resonated in the cavity. The crystal is cut for NCPM down the crystal axis requiring that the crystal be temperature tuned in the area of 110° to 120° C. in order to meet phase matching conditions. The advantage of this approach is that the alexandrite laser is tunable, so that absorption bands in the 1.5-1.6 μm range can be avoided. The degenerate mode operation exhibits extremely low thresholds and the doubly resonant operation is very efficient. The spectral linewidth is much broader for Type I compared to Type II operation, but well within the bounds of the detection system and any narrow spectral filters that might potentially be employed. The temporal output of approximately 60 ns is much longer than the 10 ns from the YAG based system due to the longer inherent pulsewidth of the alexandrite laser. For present purposes, the pulse width is not a critical parameter. Desirably, each pulse is capable of generating a single complete image of the target per pulse. The laser sources here under consideration will ordinarily accomplish this.

To optimize operation, the laser output may be homogenized to produce a more uniform spatial intensity profile in the far field. This may be accomplished, for example, through the use of fiber optics or light pipes. Other means for homogenization are known to those skilled in the art, and may be employed. However, the OPO output may be so highly multi-mode that homogenization is not needed.

Other suitable laser sources include the following (output wavelength shown in parenthesis):

| | |
|---|---|
| Tm,Ho:YAG | thulium, holmium-doped yttrium aluminum garnet (YAG) (2.1 μm); |
| Tm:YAG | thulium-doped YAG (2.0 μm); |
| Tm,Ho:YLF | thulium, holmium-doped yttrium lithium fluoride (YLF) (2.06 μm); |
| Ho,Tm:Lu$_3$Al$_5$O$_{12}$ | thulium, holmium-doped lutecium aluminate (2.1 μm); |
| Ho:YSGG | holmium-doped yttrium gallium scandium garnet (2–2.1 μm); |
| Ho:GSAG | holmium-doped gadolinium scandium aluminum garnet (2–2.1 μm); |
| HO:YSAG | holmium-doped yttrium scandium aluminum garnet (2–2.1 μm); |
| Ho:Tm:Cr:YAG | holmium, thulium, chromium-doped YAG (2.1 μm); |
| Ho:Tm:Er:YLF | holmium, thulium, erbium-doped YLF (2.06 μm); |
| Cr:Tm:YAG | chromium, thulium-doped YAG (2.02 μm); |
| Co:MgF$_2$ | cobalt-doped magnesium fluoride tunable 1.7–2.5 μm); |
| Ho:YLF | holmium-doped YLF (2.06 μm). |

In any event, the means for generating the laser beam are conventional and not part of this invention.

The Receiving, Processing, Storing and Display Means

Functional proximity focused diodes with a spectral response within the wavelength region of the illuminator systems of this invention are available. They utilize transferred electron (TE) photocathodes. These devices can be mated with GEN II intensified CCD array cameras for low light level operation. GEN II is a second generation image intensifier tube, which incorporates a microchannel plate (MCP). The incorporation of the MCP provides sufficient gain in a single stage so that streaking, distortion and vignetting are minimized. The MPC's ability to localize high current regions resulting from bright sources reduces "blooming" and wash-out, resulting in better contrast rendition. Single stage construction typically requires only a 5–6 kV intensifier power supply. CCD array cameras acre rugged, solid state charge-coupled devices providing low signal to noise ratio and good sensitivity. The arrays can provide high resolution, as fine as 9 micrometer/pixel, while providing an output signal linear with the input power. They can cover a wide spectral range ( e.g. from about 190 nm to about 1.1 microns) with excellent uniformity over the sensor surface. GEN II intensified CCD array cameras are commercially available from several sources.

The low light level camera typically is comprised of 3 main sections. They are the TE photocathode, microchannel plate (MCP) intensifier and CCD array camera. The basic operation of the transmission mode negative electron affinity (NEA) photocathode begins with an incident photon exciting an electron from the valence to conduction band of a p-type semiconductor. The photocathode consists of a p-type semiconductor activated with a thin Cs—O layer. The Fermi level is pinned at the surface causing a band bending region to be formed. The band bending results in the conduction band edge in the bulk of the semiconductor being higher in energy than the vacuum level, F, at the Cs—O surface, hence the term NEA. As a result, electrons generated by an incident photon with an energy greater than the bandgap of the semiconductor have a good probability of being emitted if they are generated within a minority carrier diffusion length of the emission surface. Although these photocathodes have excellent sensitivities, their long wavelength threshold is limited to about 1.0 μm by greatly reduced electron surface escape probabilities for semiconductors with bandgaps smaller than ~1.25 eV (wavelengths longer than 1.0 μm). The reduced escape probability is primarily a result of an interfacial barrier. This barrier height remains approximately constant as the semiconductor bandgap is decreased. Electrons at the conduction band edge must now be thermally excited over the interfacial barrier to be emitted into vacuum. This greatly reduces the electron escape probability.

The surface barrier effects in long wavelength photocathodes are overcome in externally biased photocathodes, including the TE photocathode. The TE photoemission is based on certain III-V semiconductors such as InGaAsP where electrons can be promoted to the upper conduction band with reasonable efficiency by applying modest electric fields. Photogenerated electrons which successfully transfer to the upper conduction band are then energetic enough to have a good probability of being emitted over the work function and the surface energy barriers into vacuum. Devices based on this approach have been demonstrated to 1.7 μm.

These devices are created in diode form which closely resembles a GEN III wafer with the exception of additional electrical connections required for biasing the tube. The device operates as a proximity focused diode where the incident light creates local electrons. If the tube is biased by a few volts, then the electrons have sufficient energy to be emitted into vacuum. A phosphor absorbs these electrons and emits light into a fiber optic faceplate. There is no focusing device which is why the term proximity is used. Devices with a QE of 1.4% at 1.54 µm and low dark current are known demonstrated. The QE of current GEN II devices is in the range of 8% and the GEN III devices can be as high as 30%.

The input to a standard GEN II intensifier tube is a fiber optic faceplate. By joining the TE photocathode and the GEN II section of the camera together at these fiber optic faceplates, it is possible to change photocathodes without disturbing the remainder of the camera system. This method allows for rapid integration of the photocathodes at lower cost and risk, but at the expense of sensitivity. The output of the MCP is reduced by a fiber optic minifier which matches the output of the GEN II tube to the CCD array. This becomes a standard intensified gateable camera except that the camera now does not require gating since that is now a function of the TE photocathode.

The shutter mechanism of this type of integrated TE photocathode and GEN II intensifier differs from the conventional shutter mechanism used in previous illumination systems. Due to the nature of the TE photocathode, no emission occurs unless the tube is biased by a few volts (3–10 volts). The intensifier can operate under non-gated conditions. Previous illumination systems gate the intensifier by controlling the voltage on the GEN II or GEN III tube. About two hundred fifty volts are required to shutter a GEN II tube with a minimum gating time of about 5 nanoseconds, due to the large voltage, parasitic capacitance, and the impedance of the voltage source. A GEN III device requires switching about 700 volts which increases the minimum gating time to about 70 nanoseconds. The TE photocathode structure allows nanosecond gating due to the reduced voltage requirements.

The output from the camera is standard RS-170 (the U.S. standard for black and white video). This output can be sent to frame grabbers, display monitors and recording devices, as is conventional.

Operation of the System

With reference to FIG. 1, The laser imaging system includes the illumination source (laser) 1, beam homogenizer (fiberoptic) 2, transmitter optics 3, receiver optics 4, gated-intensified camera 5, range gate electronics 6 and the video display and recording system 7. Light from the eye safe laser 1 passes through a fiber optic beam homogenizer 2 to the transmitter optics 3. The transmitter optics controls the laser beam angle and therefore the size of the illuminated spot at the target. Laser light reflected by the target is collected by the receiver optics 4 and relayed to the gated-intensified video camera 5. The camera's image intensifier is gated off during the time the laser pulse is traveling from the transmitter optics to the target. The image intensifier is then turned on just before the reflected light from the target reaches the receiver optics. Gating is effected by means of range gate electronics 6. This gating procedure prevents the video camera from being overloaded by outgoing laser light backscattered by the atmosphere at short ranges from the system. The electrical output signal from the video camera 5 can be sent to a video monitor which displays an image of the target. For laser pulse repetition frequencies less than 30 Hz (the standard video frame frequency), a frame grabber can be employed to freeze the image until the next laser pulse generates a new image. This procedure eliminates flicker in the video image.

It is an advantage of this imaging system that the laser illuminator short pulse duration freezes motion, effectively taking a complete target image snapshot with every laser pulse.

In preferred operation employing a gated camera, operation begins with sync signals stripped from the CCD array camera to provide rough synchronization of the laser pulse to the camera. The system functions by emitting a laser pulse initiating the range gate clock controlling the camera shutter. This input regulates the voltage on the TE photocathode which acts as a shutter to the camera. This shutter function eliminates the intense atmospheric backscattered laser light generated by the outgoing laser pulse near the receiver lens and it also eliminates blooming that could be caused by lights or fire within the system's field-of-view (FOV). The receiver optics collects the light and images it on the TE photocathode. The FOV of the receiver optics is usually matched to be about equal to or slightly larger than the illuminated spot at the target. A micro-channel plate (MCP) image intensifier amplifies the image from the TE photocathode. The MCP electrons are converted to photons at the phosphor screen, then imaged onto a high resolution charge coupled device (CCD) array. The array is read-out in standard RS-170 format and transferred to the frame grabber, display and recorder.

We claim:

1. An active night vision system capable of viewing a target over long distances comprising, in combination,
   (a) laser means for emitting a beam of coherent radiation having wavelength of from about 1.52 µm to about 1.76 µm or of from about 2.03 µm to about 2.34 µm for illuminating a target;
   (b) receiving means for receiving an image of the reflected radiation from said target and for transforming the optical image into an electronic signal; and
   (c) means for electronically storing and/or displaying the image received by said receiving means.

2. The active night vision system of claim 1 wherein the laser means is adapted to emit a beam of coherent radiation having wavelength of from about 1.52 µm to about 1.76 µm, at an intensity of up to about 1.0 Joules/cm$^2$.

3. The active night vision system of claim 1 wherein the laser means is adapted to emit a beam of coherent radiation having wavelength of from about 2.03 µm to about 2.34 µm, at an intensity of up to about 0.1 Joules/cm$^2$.

4. The active night vision system of claims 1, 2 or 3 wherein the laser means is adapted for pulsed operation.

5. The method of viewing a target which comprises the steps of
   (a) illuminating the target with coherent radiation having wavelength of from about 1.52 µm to about 1.76 µm or of from about 2.03 µm to about 2.34 µm;
   (b) sensing the radiation reflected from the illuminated target in said wavelength ranges of from about 1.52 μm to about 1.76 μm or of from about 2.03 μm to about 2.34 μm;

(c) intensifying said sensed reflected radiation; and (d) displaying said intensified, sensed reflected radiation.

6. The method of claim 5 wherein said target is illuminated with coherent radiation having wavelength of from about 1.52 μm to about 1.76 μm at an intensity not exceeding about 1.0 Joules/cm$^2$.

7. The method of claim 5 wherein said target is illuminated with coherent radiation having wavelength of from about 2.03 μm to about 2.34 μm at an intensity not exceeding about 0.1 Joules/cm$^2$.

8. The method of claims 5, 6 or 7 wherein said target is illuminated by pulsed coherent radiation.

9. The method of claims 5, 6 or 7 wherein said target is illuminated by coherent radiation pulsed at a rate of from about 1 to about 30 pulses pulses per second.

10. The method of claims 5, 6 or 7 wherein said target is illuminated by pulsed coherent radiation which generates a single complete image of the target per pulse.

11. The method of claims 5, 6 or 7 wherein said target is illuminated by coherent radiation pulsed at a rate of from about 1 to about 30 pulses pulses per second, and wherein each pulse generates a single complete image of the target.

* * * * *